United States Patent
Kajiura et al.

(10) Patent No.: US 6,679,926 B1
(45) Date of Patent: Jan. 20, 2004

(54) LITHIUM SECONDARY CELL AND ITS PRODUCING METHOD

(75) Inventors: Yoshio Kajiura, Wakayama (JP); Atsushi Suzuki, Wakayama (JP); Nobuyuki Isshiki, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/762,701

(22) PCT Filed: Feb. 7, 2000

(86) PCT No.: PCT/JP00/00642

§ 371 (c)(1),
(2), (4) Date: Feb. 12, 2001

(87) PCT Pub. No.: WO00/77866

PCT Pub. Date: Dec. 21, 2000

(30) Foreign Application Priority Data

Jun. 11, 1999 (JP) .......................................... P 11-165185

(51) Int. Cl.$^7$ .............................. H01M 6/00; B28B 1/00
(52) U.S. Cl. .................. 29/623.1; 29/623.4; 429/231.1; 264/614
(58) Field of Search ............................ 29/623.1, 623.5, 29/623.4; 429/231.1, 231.95, 231.2, 231.3, 232, 233; 264/681, 614, 642, 643, 666, 104; 427/126.3; 445/46

(56) References Cited

U.S. PATENT DOCUMENTS 6,287,728 B1 * 9/2001 Kajiura et al. ............ 429/231.3

FOREIGN PATENT DOCUMENTS

| EP | 709906 | 5/1996 |
|---|---|---|
| JP | 9-45334 | 2/1997 |
| JP | 10-302828 | 11/1998 |
| JP | 11-154534 | 6/1999 |
| JP | 2000-11993 | 1/2000 |
| JP | 2000-11994 | 1/2000 |
| JP | 2000-12024 | 1/2000 |
| JP | 2000-82464 | 3/2000 |
| WO | WO 98/28804 | 7/1998 |

* cited by examiner

*Primary Examiner*—Patrick Ryan
*Assistant Examiner*—R Alejandro
(74) *Attorney, Agent, or Firm*—Oblon, Spivak, McClelland, Maier & Neustadt, P.C.

(57) ABSTRACT

A lithium secondary battery including an anode and cathode containing an active material capable of incorporating and releasing lithium ions, wherein the cathode is a porous sintered material made of a lithium-transition metal oxide, the porosity of the sintered material is 15 to 60%, and the electrical conductivity is not less than 0.1 mS/cm. Since the sintered material is sufficiently sintered so that the electrical conductivity may be more than 0.1 mS/cm, the bonding power of the primary particles of the sintered material is strong, and therefore the primary particles do not come off and the electrodes do not collapse even if the sintered material expands or shrinks because of the charge/discharge. Since the mechanical strength is great, the cathode can have a larger area. The electrolyte penetrates well into the sintered material because of its 15 to 60% porosity, and consequently the internal electrical resissitivity is low. Thus a lithium secondary battery having a high capacity and excellent characteristics is provided.

15 Claims, 3 Drawing Sheets

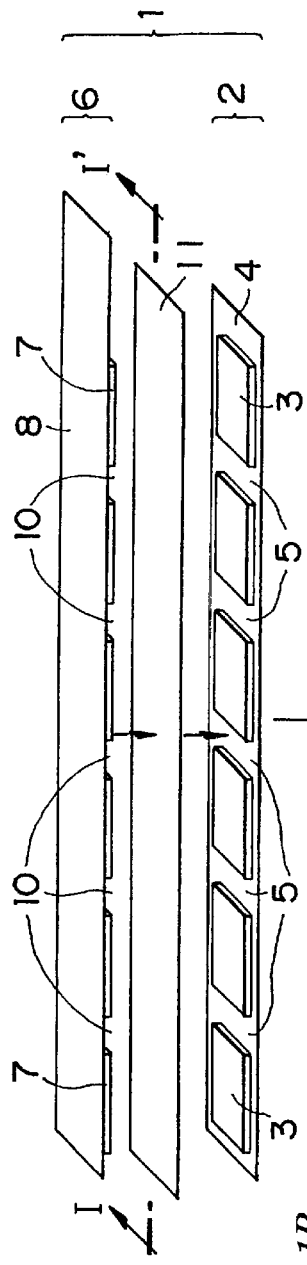
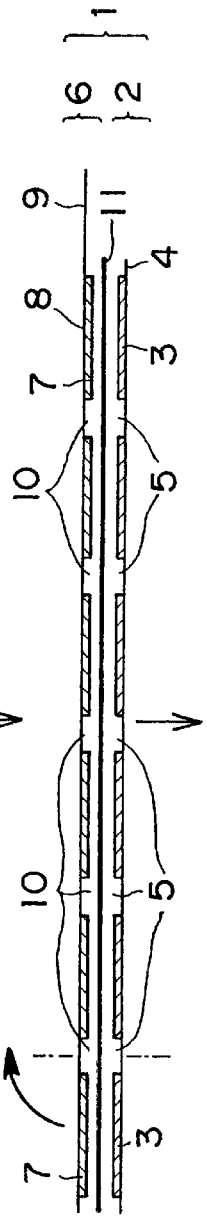
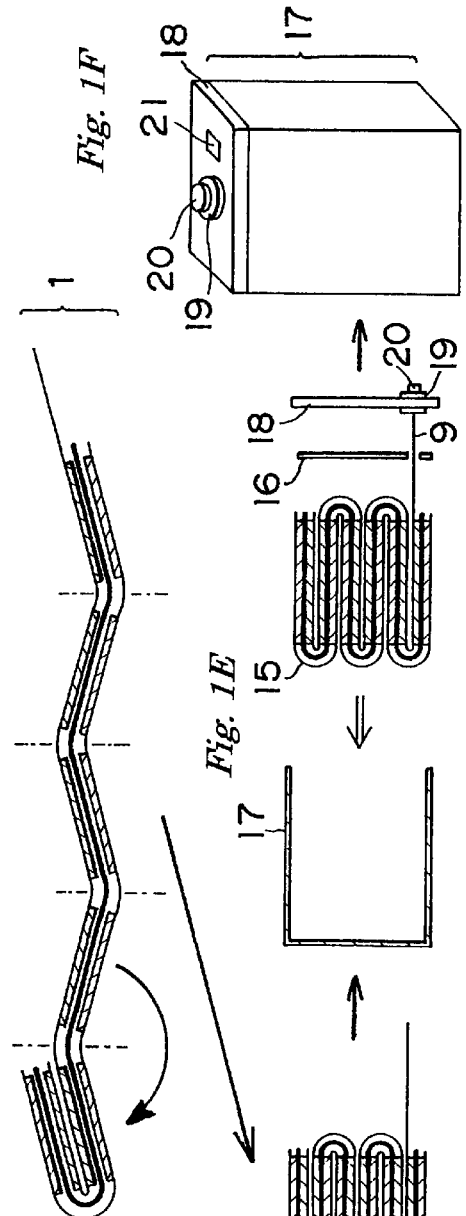
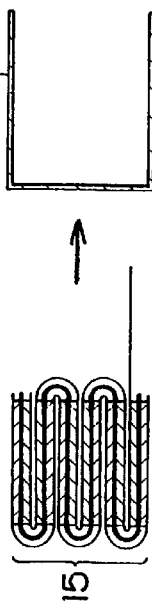
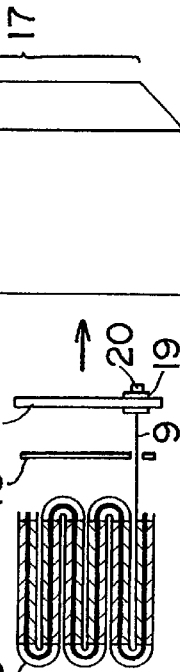
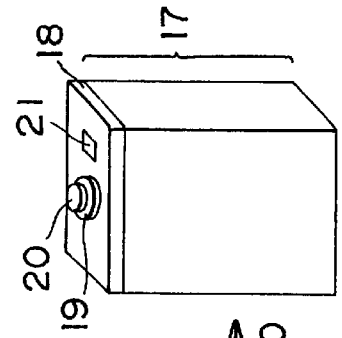

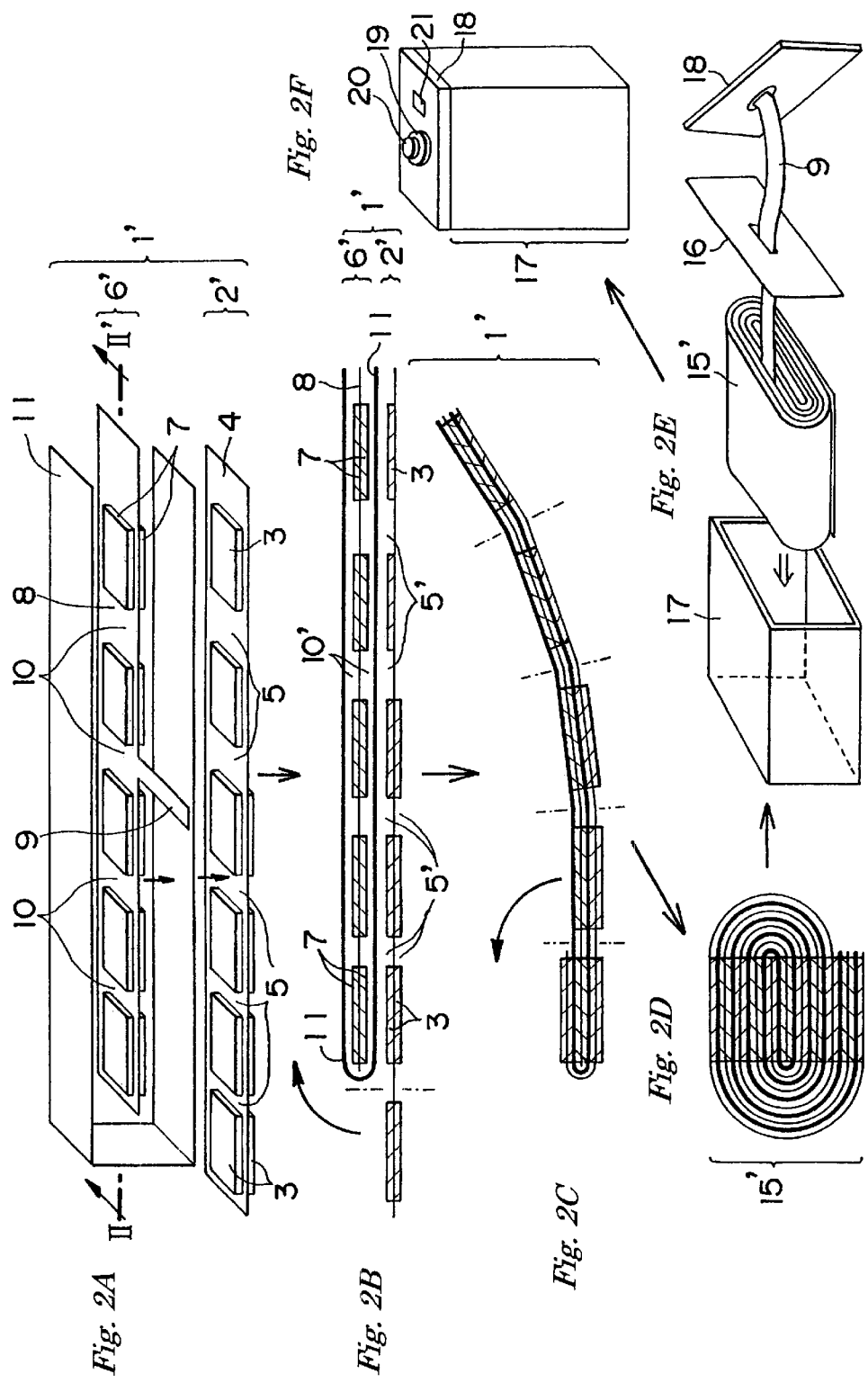

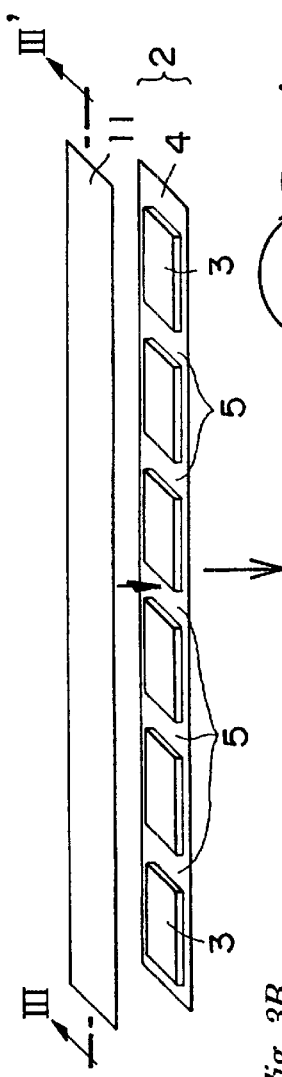
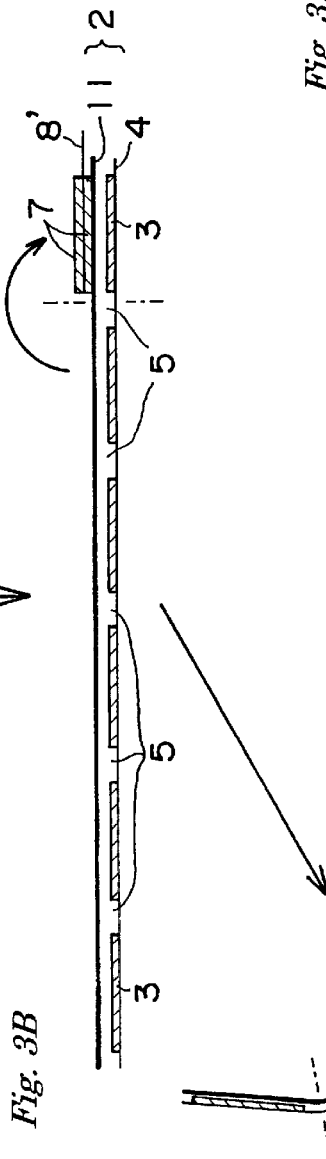
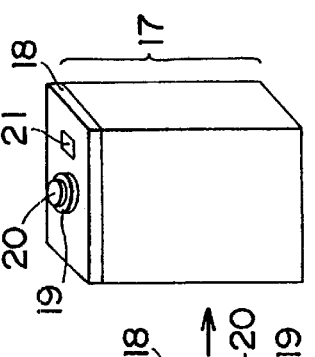
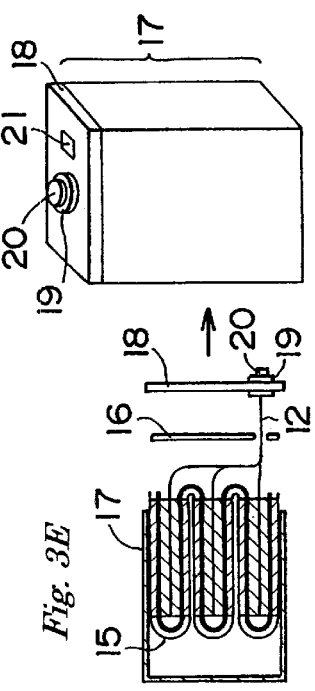
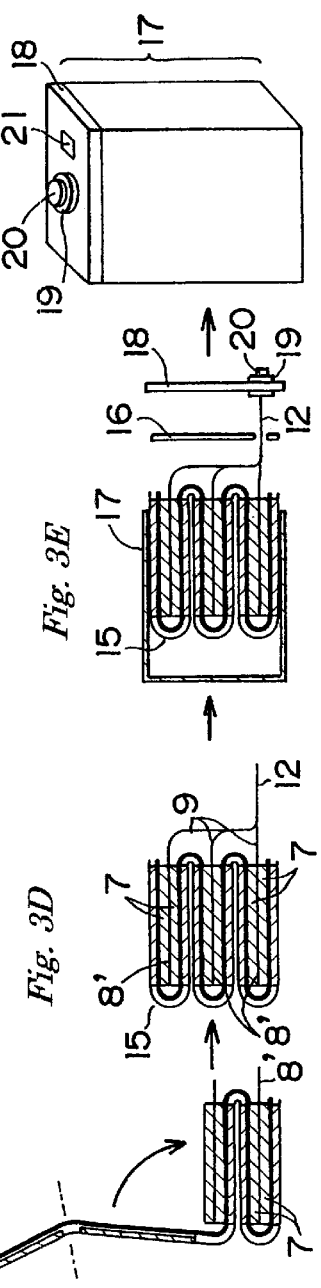
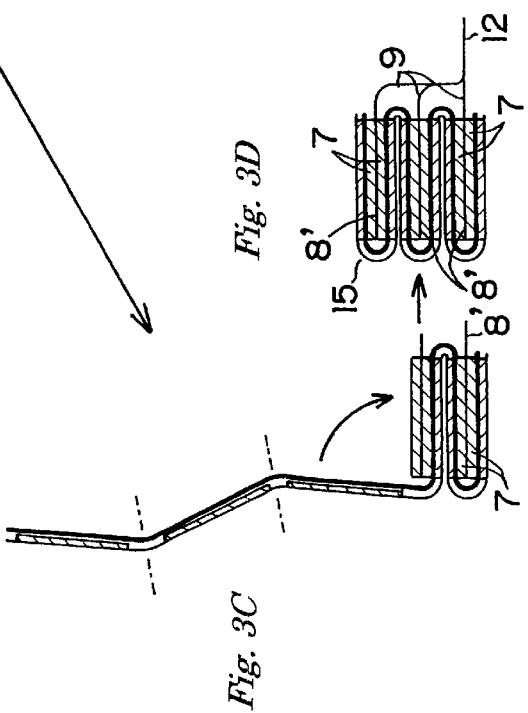

LITHIUM SECONDARY CELL AND ITS PRODUCING METHOD

BACKGROUND OF THE INVENTION

1. Field of the Invention

The present invention relates to a lithium secondary battery comprising a cathode made by sintering a hthium-transition metal oxide and having a high battery capacity and excellent charge/discharge cycle characteristic, and a method of producing the same.

2. Description of Related Art

With the popularization of cellular phones and notebook computer, the lithium secondary batteries that are capable to provide a high-energy battery density have attracted much attention. The lithium secondary battery comprises a cathode and an anode both including an active material capable of incorporating and releasing lithium ions, and a lithium ion conductive electrolytic solution or solid electrolyte. However, there is such a problem that the electrode includes such materials as a binder and an electrically conductive material that do not contribute to the battery capacity, thus resulting in a limitation to the capacity per volume of the battery.

As means for increasing the capacity per volume of the battery, an attempt to make the electrode from a sintered material, which is substantially made of an active material. When the electrode is constituted from a sintered material made of an active material, no binder is included and the addition of an electrically conductive material can be elimated or reduced, thus making it possible to increase the active material filling density and increase the capacity per volume. For example, Japanese Laid-Open Patent Publication No.8-180904 discloses a cathode made of a sintered lithium-transition metal oxide. According to this disclosure, powder of a lithium-transition metal oxide or raw material powder thereof is pressed to form a molded material by using a die, with the mold material being fired at a predetermined temperature in the presence of oxygen, thereby to obtain a sintered material. However, an electrical conductivity of the sintered material is not sufficient for the cathode, and therefore it is necessary to improve the performance further.

For making the lithium secondary battery thinner, it is effective to reduce the thickness of the cathode and the anode that make up most of the thickness of the battery. In order to reduce the thickness of the cathode made of a sintered material, it is necessary to increase the surface area of the sintered material for securing a predetermined battery capacity. When the sintered material is made by the press molding, however, increasing the area of the die for the purpose of increasing the surface area of the sintered material makes it difficult to fill the cavity of the die uniformly with the powder of lithium-transition metal oxide or raw material powder thereof, resulting in unevenness of the thickness and a density of the molded material in a planer direction. As a result, sintering reaction does not proceed uniformly in the molded material, thus resulting in unevenness in the density of the sintered material in the planer direction. When such a sintered material is used as the electrode in a battery, there have been problems of a decrease in the battery capacity and poor charge/discharge cycle characteristic. In case there is a portion where sintering reaction has not progressed enough, on the other hand, bonding strength between primary particles that constitute the sintered material decreases in the portion, resulting in lower mechanical strength of the sintered material This leads to such problems, as the electrode is likely to disintegrate during charging or discharging, and a decrease in the battery capacity and poor charge/discharge cycle characteristic.

In case a current collector is pressed to the sintered material of lithium-transition metal oxide to form a laminate, there is a significant contact resistance between the current collector and the sintered material, leading to a filure in improving the battery capacity and the charge/discharge cycle characteristic. To counter this problem, for example, Japanese Laid-Open Patent Publication No.8-180904 described above discloses a method of decreasing the contact resistance by sintering the powder of a lithium-transition metal oxide or raw material powder of a lithium-transition metal oxide and, at the same time, integrating the sintered material with a current collector of aluminum. However, since sintering and integration with the current collector are carried out simultaneously, the firing temperature cannot be made sufficiently high. As a result, the sintering process tends to be insufficient thus leading to lower strength and/or lower electrical conductivity of the sintered material, resulting in insufficient improvement in the charge/discharge cycle characteristic.

Also when producing a battery wherein at least the cathode is made of a sintered material, the electrode cannot be wound as in the case of the conventional coated electrode because the sintered material has a low bending strength. When an electrode unit consisting of one sintered cathode and one sintered anode is to be assembled, for example, both electrodes can be easily aligned with each other simply by stacking the cathode and the anode to oppose each other while interposing a separator therebetween. However, when a battery having an electrode unit consisting of a number of pairs of cathode and anode is to be assembled for the purpose of achieving a large battery capacity, a plurality of cathodes and anodes must be accurately aligned to oppose each other via separators. This leads to a longer period of time for stacking the electrodes and the electrode unit, or requires it to use a high precision apparatus for alignment. Also there has been such a problem that, when moving a stacking electrode unit or housing the stacking electrode unit in a battery casing after the stacking process, the electrodes are shifted from the predetermined positions, thus leading to a decrease in the area over which the mating electrodes face each other, and resulting in a decrease in the battery capacity of the completed battery. Moreover, there has been such a problem that a current collecting lead wire is required for each electrode to ensure conduction to the plurality of cathodes and the anodes, thus giving rise to the difficulty of disposing the lead wires.

SUMMARY OF THE INVENTION

An object of the present invention is to provide a lithium secondary battery that, by providing a cathode of larger surface area and higher mechanical strength, has a large battery capacity and excellent charge/discharge cycle characteristic.

Another object of the present invention is to provide a lithium secondary battery that, with a current collector being integrated with a sintered material of a lithium-transition metal oxide without lowering the mechanical strength and electrical conductivity thereof, has a large battery capacity and excellent charge/discharge cycle characteristic.

Still another object of the present invention is to provide a lithium battery that comprises the electrode made of a plurality of sintered materials, where the cathodes and the anodes will not be shifted from the predetermined positions and high reliability is ensured.

The present inventors completed the present invention by finding out that the electrical conductivity can be used as an index of the bonding strength between primary particles that constitute a sintered material when forming the sintered material of a lithium-transition metal oxide, and that sufficient mechanical strength can be obtained by using a sintered material having a high electrical conductivity.

The lithium secondary battery of the present invention includes a cathode and an anode, each electrode containing an active material capable of storing and releasing lithium ions, wherein the cathode is a porous sintered material made of a lithium-transition metal oxide that has a porosity in a range from 15 to 60% and an electrical conductivity of more than 0.1 mS/cm. According to the present invention, since the porosity of the sintered material that constitutes the cathode is in a range from 15 to 60%, an electrolytic solution infiltrates sufficiently into the sintered material under such a condition that filling density of the active material is maintained at a high level. With this constitution, the internal electrical resistance can be decreased without decreasing the battery capacity. Also by sintering enough to achieve electrical conductivity of more than 0.1 mS/cm, high bonding strength between primary particles of the sintered material can be achieved so that the primary particles do not come off and the electrode does not disintegrate even when the sintered material expands and shrinks during charging and discharging cycles of the battery. High mechanical strength also makes it possible to form the cathode of larger surface area. Thus the cathode having the porosity in a range from 15 to 60% and the electrical conductivity of more than 0.1 mS/cm provides the battery with a large battery capacity and excellent charge/discharge cycle characteristic.

A method of producing a lithium secondary battery including a cathode and an anode, each containing an active material capable of incorporating and releasing lithium ions according to the present invention, cathode being made by sintering the lithium-transition metal oxide at a temperature higher than the melting point of the current collector, the method includes the steps of pressing the sintered material to the current collector, and heating at a temperature lower than the melting point of the current collector so as to join the sintered material to the current collector, thereby integrating the sintered material and the current collector. Since sintering is carried out at a temperature higher than the melting point of the current collector, sintering reaction can be accelerated and therefore the strength and electrical conductivity are increased. Further, since the sintered material and the current collector are integrated at a temperature lower than the melting point of the current collector, so that the current collector is not damaged by thermal deformation, and the contact resistance can be decreased. Consequently, strength and electrical conductivity of the sintered material are improved, and the cathode having lower contact resistance improves the charge/discharge cycle characteristic.

In the method of producing the lithium secondary battery according to the present invention, the step of forming the sintered material includes a) adding a binder and a solvent to a cathode material consisting of the powder of a lithium-transition metal oxide, thereby to prepare a coating solution; b) applying the coating solution to a base material and removing the solvent to form the coating film; and c) firing the coating film in the presence of oxygen to sinter the cathode material, thereby to form the sintered material. Since the coating film containing the cathode material consisting of the powder of a lithium-transition metal oxide is fired to form the sintered material, the cathode having a larger surface area and an uniformity in thickness and density can be obtained. The cathode can improve the battery capacity and cycle characteristic.

The method of producing the lithium secondary battery according to the present invention is capable of forming the sintered material with a uniform thickness and pressing the sintered material to the current collector. The sintered material with uniform thickness makes it possible to press the current collector uniformly over the entire surface of the sintered material. As a result, adhesion between the sintered material and the current collector can be improved and the electrical contact resistance can be decreased without causing the sintered material to deform and crack when pressing.

The lithium battery of the present invention is a battery comprising a stacked electrode formed of a multilayered electrode unit which includes cathodes and anodes piled via a separator and has strip-shaped current collector, wherein at least the cathodes are sintered materials which are aligned on and joined to one of the current collectors and spaced from one another at bending portions defined by desirable intervals on the current collector, and the cathodes and the anodes are disposed in the stacked electrode, with each anode opposed to the respective cathode. The cathodes and the anodes are accurately aligned so that the electrodes will not be shifted from the predetermined positions, and a current collection can be easily made since providing only one lead wire for each of the cathodes and the anodes suffices, and therefore a lithium secondary battery of high reiability can be achieved.

The battery including the stacked electrode described above is produced by a method, which includes the step of forming at least a cathode electrode sheet, on at least one side of the strip-shaped current collector, having a plurality of sintered material electrodes aligned on and joined thereto and spaced from one another at bending portions defined by desirable intervals on the current collector; the step of bending the stack which includes the cathode electrode sheet and an anode electrode sheet piled via a separator so that each cathode oppose the respective anode; and the step of housing the stack in a battery casing.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals.

FIG. 1A to 1F is a schematic sectional view showing a method of producing a battery A according to the third embodiment of the present invention.

FIG. 2A to 2F is a schematic sectional view showing a method of producing a battery B according to the third embodiment of the present invention.

FIG. 3A to 3F is a schematic sectional view showing a method of producing a battery C according to the third embodiment of the present invention.

DESCRIPTION OF THE PREFERRED EMBODIMENTS

This application is based on application No.11-165185 filed Jun. 11, 1999 in Japan, the content of which is incorporated hereinto by reference.

The lithium secondary battery of the present invention comprises a stack body constituted from, for example, a cathode current collector, a cathode, a separator including a non-aqueous electrolytic solution or a non-aqueous electrolyte made of a polymer solid electrolyte, an anode, and an anode current collector.

The cathode used in the present invention includes the lithium-transition metal oxide as a cathode active material. The lithium-transition metal oxide may be any conventionally known material. For example, $Li_xCoO_2$, $Li_xNiO_2$, $Li_xMnO_2$, $Li_xMn_2O_4$, $Li_xMn_{2-y}O_4$ or the like may be used. As the compounds of lithium and the transition metal used as the raw material, hydroxide, oxide, nitride and carbide of these metals may be used.

The anode material used in the present invention includes such carbon materials as graphite, amorphous carbon or a mixture thereof, for example, such as a material made by carbonizing cokes, natural graphite, artificial graphite or pitch, and a mixture thereof. A sintered material made from a composite material of silicon and carbon material as described in International Publication WO98/24135 may be used As the non-aqueous electrolyte used in the present invention, a non-aqueous electrolytic solution prepared by dissolving a lithium compound such as $LiPF_6$, as the electrolyte in an organic solvent such as ethylene carbonate or dimethyl carbonate, or a polymer solid electrolyte made of a polymer that holds a lithium compound in the state of solid solution or an organic solvent, wherein the lithium compound is dissolved, may be used.

The sintered material of the lithium-transition metal oxide used in the present invention can be made as described below.

A coating solution is prepared by dispersing a powder of a lithium-transition metal oxide or a raw material powder of the lithium-transition metal oxide together with a binder in a solvent, then the coating solution is applied to a base material which is, after removing the solvent, fired to sinter in the presence of oxygen. It is more preferable to fire in the presence of oxygen after removing the solvent and peeling the coating film off the base material, since this prevents the coating film from warping during firing. For the base material, a film or a sheet of an organic polymer or a metal foil or sheet may be used, while an organic polymer film is more preferable. In order to make use of the advantage of the present invention that the sintered material can be made uniform even when it is made to have a large surface area, the sintered material preferably has a size of 20 mm×20 mm or larger, and more preferably 40 mm×40 mm or larger. The sintering temperature is such a level as the binder is completely oxidized and decomposed and the sintering reaction proceeds sufficiently, that is higher than the melting point of the current collector, in a range from 700 to 1100° C. and preferably in a range from 800 to 1000° C. Duration of sintering is from 0.1 to 100 hours, preferably from 1 to 50 hours.

As the binder, for example, there can be used thermosetting resins such as urethane resin, phenol resin, and epoxy resin; thermoplastic resins or elastomers, such as polyethylene and polypropylene; homopolymers or copolymers of containing a monomer such as vinylidene fluoride, ethylene fluoride, acrylonitrile, ethylene oxide, propylene oxide and methyl methacrylate; and polyvinyl alcohol or polyvinyl butyral.

In order to form communicating holes that are effective as the passage of ions, a pore-forming agent may be used. The pore-forming agent is a substance that is not soluble to the solvent used in the preparation of the coating solution, and may be a substance that is completely oxidized and decompose in air atmosphere at a temperature close to the thermal decomposition temperature of the binder, for example short fibers of organic materials (diameter from 0.1 to 100 μm) such as nylon fiber, acrylic fiber, acetate fiber and polyester fiber, or organic polymer particles such as polymethyl methacrylate (PMMA) having diameters from 0.1 to 100 μm. When the pore-forming agent is fired to oxidize and decompose, ion passages can be effectively formed. Because a diffusion of the ions is not prevented, the ion passages can suppress a concentration polarization of ions, thereby to decrease the internal electrical resistance.

The porosity of the cathode that is obtained is preferably in a range from 15 to 60%, and more preferably in a range from 30 to 50%. When the porosity is lower than 15%, the electrolytic solution cannot infiltrate into the sintered material sufficiently, resulting in a high internal electrical resistance. When the porosity is higher than 60%, filling density of the active material becomes lower and the desired battery capacity cannot be obtained. As used herein, the porosity is an open pore volume, and is measured on the basis of the Archimedean principle described below. Archimedean principle: Porosity can be determined by the following equation:

$$\text{Porosity} = \text{Ratio of open pore volume}$$
$$= (W_3 - W_1)/(W_3 - W_2) \times 100$$

where $W_1$ is an initial weight of a sample, $W_2$ is a weight measured in water after purging air from pores by decreasing the pressure or boiling in water and then cooling, and $W_3$ is a weight measured after being taken out of water and wiped to remove water drops on the surface, then the porosity is given as shown above.

The electrical conductivity of the sintered material used in the cathode is preferably 0.1 mS/cm or higher, and more preferably 1 mS/cm or higher This increases the bonding strength between primary particles of the sintered material and improves the mechanical strength of the electrode.

The sintered material of the lithium-transition metal oxide formed in the process described above and the current collector can be integrated as follows. The sintered material and the current collector are laminated under a pressure, and heated at a temperature lower than the melting point of the current collector.

When aluminum is used for the current collector, heating temperature is from 50 to 600° C., preferably from 100 to 300° C., while there is no particular limitation on the heating time as long as the duration is not less than one second. While there is no limitation on the ambiance during heating, air atmosphere or non-oxidative atmosphere is preferable.

The sintered material with a uniform thickness makes it possible that the current collector is pressed to the sintered material uniformly over the entire surface thereof. For the purpose of forming the sintered material with a uniform thickness, the method described previously where the coating film is formed on the organic polymer film is preferable, but a method of polishing the surface of the sintered material may also be employed.

As the cathode current collector in the present invention, aluminum, titanium or stainless steel, or an alloy that includes any of these may be used, while aluminum is preferable. This material may be in the form of either foil or mesh.

When a sintered material is used for the anode, it may be joined with the anode current collector by, for example, a method described below. The sintered material is pressed to the current collector and heated at a temperature lower than the melting point of the current collector. When copper is used for the current collector, heating temperature is from 50 to 1000° C., while there is no particular limitation on the heating time as long as the duration is not less than one second. The ambiance during heating is preferably air atmosphere or non-oxidative atmosphere. Or, alternatively, a coating film including an active material may be formed on the current collector, which is then heated to sinter.

The present invention will now be described in detail below, by way of preferred embodiments thereof.

Embodiment 1

A battery of the first embodiment was produced by a method described below.

(Formation of Cathode)

60 Parts by weight (hereinafter parts by weight are abbreviated to parts) of $LiCoO_2$ was mixed with 3.4 parts of polyvinyl butyral as a binder, 0.85 parts of dioctyl adipate as a plasticizer and 28 parts of a mixed solvent of toluene and 1-butyl alcohol in a volume ratio of 4:1, and the mixture was kneaded in a ball mill for 24 hours. This coating solution was applied to a polyester film having a thickness of 50 $\mu$m that had been treated with silicone, then the film was dried at 80° C. for 20 minutes thereby to obtain a coating film having a size of 300×150 mm. The coating film was removed from the polyester film and was cut into pieces having a size of 30×40 mm, which were fired at 900° C. in air atmosphere for 10 hours, thereby to obtain a sintered body of $LiCoO_2$ having a thickness of 300 $\mu$m ±3% and porosity of 41%. The shrinkage ratio after firing {=1−(Length after firing/Length before firing) was about 7%. The electrical conductivity of the sintered material was measured by the method described below. As a result, it was 13 mS/cm.

The electrical conductivity of the sintered material was measured by the four-terminal method. Four leads were connected to the sintered material parallel to each other at a predetermined space from each other, with the outermost two leads used for supplying current and the innermost two leads used for measuring voltage, being connected to current source and a volt meter, respectively. While changing the current I from −1 mA to +1 mA, voltage V was measured to determine the resistance R, and the conductivity a was calculated by the following equation:

$$\sigma = (R \times A/l)^{-1}$$

where l is a distance between the two voltage measuring leads, and A is a cross sectional area of the sintered material perpendicular to the direction of current.

With an aluminum foil having a thickness of 14 $\mu$m being attached to the sintered material, the sintered material was heated to 300° C., then cooled down to the room temperature, thereby to obtain a cathode integrated with the current collector.

(Formation of Anode)

90 Parts of crystalline silicon powder of purity 99.9% having a mean particle diameter of about 1 $\mu$m and 70 parts of a N-methyl-2-pyrrolidone (hereinafter abbreviated to NMP) solution of poly (vinylidene fluoride) (14% by weight) were mixed to prepare a uniform coating solution. This coating solution was applied to the copper foil of the current collector and dried at 80° C. for 20 minutes. The dried film was punched through to obtain a piece having a size of 20×40 mm, that was fired at 800° C. in nitrogen atmosphere for three hours, thereby to form an anode integrated with the current collector.

(Production of Battery)

An electrolytic solution was prepared by dissolving 1 mol/L of $LiPF_6$ in a mixed solvent of propylene carbonate and dimethyl carbonate in a volume ratio of 1:1. The cathode and the anode described above were piled via a separator made of a porous polyethylene film, and the stack was put into a battery housing, with the battery housing being filled with the electrolytic solution and sealed, thereby maling the battery.

The battery made by the method described above will be referred to as sample No. 1. After leaving the sample No. 1 to stand at the room temperature for a full day, charge and discharge test was conducted, with the result showing the discharge capacity of 55 mAh in the first cycle and the capacity retention ratio {=(discharge capacity in $50^{th}$ cycle/ discharge capacity in 1st cycle)×100} of 90% in the fiftieth cycle.

Sample No. 2 is a battery that employs a cathode made by the cathode forming method described above, except that 3 parts of spherical polymethyl methacrylate (PMMA) having a diameter of 5 $\mu$m was added as a pore forming agent to the coating solution. Sample No. 2 had a porosity of 43%. The shrinkage ratio of the sintered body after firing was about 7%, and the electrical conductivity was 5 mS/cm. The discharge capacity in the first cycle was 60 mAh and the capacity retention ratio in the fiftieth cycle was 90%.

Sample No. 3 is a battery that employs a sintered material having a thickness of 300 $\mu$m ±3% and porosity of 43% made by the cathode forming method described above by firing at a temperature of 900° C. for three hours in air atmosphere. The shrinkage ratio of the sintered body after firing was about 2%, and the electrical conductivity was 0.04 mS/cm. The discharge capacity in the first cycle was 60 mAh and the capacity retention ratio in the fiftieth cycle was 10%.

Sample No.4 employed a molded material instead of a coating film in forming the cathode. 10 Parts of polyethylene powder was added as an auxiliary forming agent to 100 parts of $LiCoO_2$ powder. Although it was attempted to press the mixture in a die to make a molded material having a size of 20×40 mm, the powder could not be packed uniformly and the molded material could not be made.

The results obtained from the samples No. 1 to No. 3 show that a sintered material having higher electrical conductivity has higher shrinkage ratio after firing, indicating bonding between the primary particles that constitute the sintered material is accelerated resulting in increased bonding force between the primary particles. Also higher battery capacity retention ratio was achieved with a sintered material of higher electrical conductivity. This is supposedly because the high bonding force between the primary particles prevents the primary particles from coming off and the electrode from disintegrating even after the electrode has repeated expansion and shrinkage during the charge and discharge cycles. Moreover, since the sintered material is used, filling density of active material is high and the battery capacity per unit area is large. The result of sample No.4 shows that it is difficult to make the cathode having a large surface area by the method of using molded material.

Embodiment 2

Batteries according to the second embodiment were produced by the following method.

(Formation of Cathode)

Lithium carbonate powder and cobalt carbonate powder were mixed in a molar ratio of Li/Co=1/1, and the mixture was calcinated at a temperature of 800° C. for 5 hours in air atmosphere. This was ground to make calcinated powder.

Spherical PMMA particles having a mean particle diameter of 5 µm was mixed as a pore-forming agent by 5 wt % to the calcinated powder, with the mixed powder being pressed into a molded material which was fired at a temperature of 900° C. for 10 hours in air atmosphere, thereby to obtain a pellet-shaped sintered material of 19 mm in diameter and 94 µm in thickness, having a density of 3.0 g/cm$^3$ and porosity of 41%. The electrical conductivity of this sintered material was 5 mS/cm.

With an aluminum foil having a thickness of 14 µm being attached, the cathode was heated to 300 ° C. After cooling down the cathode to the room temperature, peel-off test was conducted to make sure that the aluminum foil and the sintered material were integrated.

(Formation of Anode)

With 3 parts of polyvinylidene fluoride being dissolved in 70 parts of NMP, 27 parts of natural graphite having a particle diameter of about 10 µm was added and mixed in a vibration mill to prepare a coating solution. The coating solution thus prepared was applied to a copper foil having a thickness of 14 µm by using a Baker's applicator thereby forming a coating film having thickness of 74 µm which was used as the anode.

(Preparation of Battery)

The cathode integrated with a current collector, the anode and a porous polyethylene film were stacked so that the active material surfaces of both electrodes face each other via the porous polyethylene film, and the laminate was immersed in an electrolytic solution that was prepared by dissolving LiPF$_6$ in a mixed solvent of ethylene carbonate and dimethyl carbonate in a volume ratio of 1:1, with the concentration being adjusted to 1 mol/L, thereby making the battery of sample No.5.

Charge/discharge test was conducted under the following conditions. Current, upper limit of voltage and charging period of constant current-constant voltage charging were set to 4 mA, 4.1 V and 3 hours, while current and lower limit of voltage of constant current discharging were set to 2.6 mA and 2.5 V, respectively. Charging and discharging operations were repeated for 50 cycles, and the charge and discharge capacities were measured.

Sample No. 6 is a battery that employs cathode made by the method described below. Lithium carbonate powder and cobalt carbonate powder were mixed in molar proportion of Li/Co=1/1, and the mixture was calcinated at a temperature of 800° C. for 5 hours in air atmosphere. This was ground to make calcinated powder. 100 Parts of the calcinated powder and 8 parts of polyvinylidene fluoride were mixed in NMP thereby to prepare a coating solution. The coating solution was applied to an aluminum foil having a thickness of 14 µm and dried. The dried film was punched through to obtain a pellet having a size of 19 mm in diameter, that was pressed to an aluminum foil and heated to 500° C. thereby to fire the coating film and integrate it with the aluminum foil The sintered material thus obtained was 100 µm in thickness, and had a density of 3.0 g/cm$^3$ and a porosity of 41%.

As described above, sample No. 6 has cathode sintered and integrated with the current collector simultaneously. Sample No. 5, on the other hand, has cathode formed by integrating the sintered material made by sintering at 900° C., higher than the melting point of the aluminum foil of the current collector, and the current collector at 300° C., lower than the melting point of the current collector.

In the charge/discharge test, the initial charging capacity of sample No. 6 was 25% that of samples No. 5. The initial charge/discharge efficiency was 98% with sample No. 5 and 20% with sample No. 6. The discharge capacity in the 50th cyde was 93% of the initial charge capacity with the sample No. 5, while that of the sample No. 6 was 0% which meant that charging and discharging were impossible. While the discharge voltage of the sample No.5 did not change after repeating 50 cycles of charge and discharge, the sample No. 6 showed a decrease in the discharge voltage. The cathode of the sample No. 5 showed a high strength and a high electrical conductivity, and larger battery capacity and better cyde characteristic than the sample No. 6.

Embodiment 3

FIGS. 1A–1F, FIGS. 2A–2F and FIGS. 3A–3F show schematic sectional views of processes for producing the lithium secondary batteries according to this embodiment of the present invention. The secondary battery of this embodiment includes a stack formed of a multilayered electrode unit that includes cathodes and anodes piled via a separator and has strip-shaped current collectors.

FIGS. 1A–1F shows a battery A having a stacked electrode formed by folding a multilayered electrode unit, FIGS. 2A–2F shows a battery B having a stacked electrode formed by winding a multilayered electrode unit, and FIGS. 3A–3F shows a battery C having a stacked electrode formed by folding the multilayered electrode unit in a different way from the battery A.

The process of producing the battery A will be described first. FIG. 1A is a perspective view showing the structure of a multilayered electrode unit 1. The multilayered unit 1 comprises a cathode sheet 2 and an anode sheet 6 that oppose each other via a separator 11. The cathode sheet 2 comprises a strip-shaped cathode current collector 4 and a plurality of cathodes 3 made of sintered material aligned on and joined to one side of thereof. The plurality of cathodes 3 are joined while being spaced from one another at a plurality of bending portions 5 that secure spaces required for bending and are defined by desirable intervals on the cathode current collector 4. The anode sheet 6 has a structure similar to that of the cathode 2, including a strip-shaped anode current collector 8 and a plurality of anodes 7 made of sintered material aligned on and joined to one side of thereof, the plurality of anodes 7 being joined while being spaced from one another at a plurality of bending portions 10 defined by desirable intervals on the anode current collector 8. In the anode sheet 6, one end of the strip-shaped anode current collector 8 is stretched in the longitudinal direction to form the anode lead 9.

When producing the battery A, the spaces of the bending portion 5 on the cathode side and the bending portion 10 on the anode side are made substantially equal to each other. The space of the bending portion of the electrode sheet on the outside of bending should ideally be made larger by the amount of thickness of the multilayered electrode unit. However, since the size of the width of the electrode is 10 mm or larger in contrast to the multilayered electrode unit having thickness of about several hundreds of micrometers, the space of the bending portion may be made substantially the same. Therefore, when a pair of the cathode 3 and the anode 7 disposed on the ends of the cathode sheet 2 and the anode sheet 6 are piled to oppose each other, the multilayered electrode unit 1 can be made so that all cathodes 3 and the anodes 7 oppose each other as shown in FIG. 1B. FIG. 1B is a sectional view taken along lines I–I' of FIG. 1A Then the multilayered electrode unit 1 is folded by alternately folding up and folding back at the bending portions 5 and the bending portions 10 as shown in FIG. 1C, so that the adjacent cathodes 3 oppose each other and the adjacent anodes 7 oppose each other. Then a stacked electrode 15 is formed by completely folding the multilayered electrode unit 1 (FIG. 1D). Then the anode lead 9 that extends from the front end of the stacked electrode 15 is welded onto an anode terminal 20 via an insulation plate 16, while the stacked electrode 15 is housed in a can 17 so that the rear end of the stacked electrode 15 and the cathode current collector on the outermost layer are brought into contact with the bottom and wall surfaces of the can 17 (FIG. 1E). Then the can 17 is sealed with a lid 18 that has a gas purging hole 21 and welded by laser. After filling the can with a non-aqueous electrolytic solution in a non-aqueous environment, the can is sealed to complete the battery (FIG. 1F). The anode terminal 20 is fastened onto the lid 18 via insulating packing 19.

FIGS. 2A–2F shows the process of producing the battery B. Processes other than those shown in FIGS. 2A to 2E and the formation of the electrodes can be done similar to the process of producing the battery A. FIG. 2A is a perspective view showing the structure of a multi-layered unit 1'. A cathode sheet 2' and an anode sheet 6' have a plurality of cathodes 3 and a plurality of anodes 7, both made of the sintered material, being joined on both sides thereof. An end of the cathode sheet 2' is located on the outermost layer after being wound, and therefore the cathode may be joined only on one side of the cathode current collector 4. The spaces of the bending portion 5' on the cathode side and the bending portion 10' on the anode side are increased along the longitudinal direction of the current collector, to provide allowance for winding. Connected to the anode sheet 6' is the strip-shaped lead 9 that protrudes sideways. The cathode sheet 2' and the anode sheet 6' are held between two halves of one folded separator, and piled as shown in FIG. 2B, to form a multilayered electrode unit 1'. FIG. 2B is a sectional view taken along lines II–II' of FIG. 2A. Then the multi-layered electrode unit 1' is bent at the bending portions 5', 10' as shown in FIG. 2C, and piled so that the plurality of cathodes 3 and the plurality of anodes 7 oppose each other via the separator 11, to form a stacked electrode 15' (FIG. 2D). Then the strip-shaped anode lead 9 that protrudes sideways from the anode sheet 6' is welded onto the anode terminal 20 via an insulation plate 16, while the stacked electrode 15' is housed in the can 17 from the side opposite to the anode lead 9 so that the cathode current collector on the outermost layer of the stacked electrode 15' makes contact with the wall of the can 17 (FIG. 2E). The subsequent process to complete the battery is similar to the case of the first embodiment (FIG. 2F).

Since the battery B has the plurality of cathodes and the plurality of anodes on both sides of the cathode sheet and the anode sheet, respectively, the amount of the active material contained can be made larger than the case of providing the cathodes or the anodes only on one side, thus achieving a higher energy density of the battery.

FIGS. 3A–3F shows a process of producing the battery C. FIG. 3A is a perspective view showing the structure of the cathode sheet 2, and FIG. 3B is a sectional view taken along lines III–III' of FIG. 3A. In FIG. 3B, a pair of anodes, which are joined on one side thereof to the anode current collector 8', are placed on the cathode 3 at the end of the cathode sheet 2. The cathode sheet 2 includes the strip-shaped cathode current collector 4 and a plurality of cathodes 3 formed on one side thereof from the sintered material. The plurality of cathodes 3 are joined while being separated by a plurality of bending portions 5 that provide spaces necessary for bending. The cathode sheet 2 is folded on the bending portion at the end so that the adjacent cathodes 3 hold therebetween a pair of anodes 7 that are placed on the cathode 3 via the separator 11. Then the cathode sheet 2 and the separator 11 are folded back at the bending portion 5 so that the adjacent cathodes 3 opposes each other (FIGS. 3B, 3C). This operation is repeated a plurality of times to fold up the cathode sheet 2, so that the cathodes and the anodes oppose each other, thereby to form the stacked electrode 15 (FIG. 3D). For the anodes, for example, a pair of anodes 7 made of the sintered material joined onto a rectangular anode current collector 8' may be used. The anode current collector 8' has the strip-shaped anode lead 9 that protrudes at one end thereof The plurality of anode leads 9 extending from the front end of the stacked electrode 15 is bundled into an anode-connecting conductor 12 (FIG. 3D). Then the anode connecting conductor 12 is welded onto the anode terminal 20 via an insulation plate 16, while the stacked electrode 15 is housed in the can 17 so that the rear end of the stacked electrode 15 and the cathode current collector on the outermost layer make contact with the bottom and the wall of the can 17 (FIG. 1E). The subsequent process to complete the battery is similar to the case of the first embodiment (FIG. 3F). An anode sheet that includes a plurality of anodes made of sintered material may be used instead of the cathode sheet, and sintered cathodes may be used instead of the sintered anodes. In the battery C, since the sintered electrode sheet is folded after covering the sintered electrodes, the electrodes can be aligned easily and displacement of the electrodes can be prevented.

In FIGS. 1A–1F or FIGS. 2A–2F, the anodes 7 may also be constituted from coating film electrodes. When forming the coating film electrodes, a heat treatment at a high temperature is not necessary unlike the case of forming the sintered electrodes. Therefore, the electrodes can be formed more easily than the case where the sintered material is used for the cathodes and the anodes. The coating film electrode may be a strip-shaped current collector coated with a coating solution containing the active material and a binder, which is then dried to integrate therewith. For example, a coating film that includes a compound of silicon and a carbon material or a carbon material as the anode active material may be used.

Now an example of the method of producing the battery A will be described below.

(Formation of Cathode)

Two sintered materials made similarly to the sample No. 1 of the first embodiment were placed on an aluminum foil having thickness of 14 $\mu$m and spaced from one another at a distance equal to the space of the bending portion and, while being pressed thereon, were heated to 300° C. thereby to form the cathode sheet. After cooling down the cathode to the room temperature, peel-off test was conducted to make sure that the aluminum foil and the sintered material were integrated. The sintered cathode having a size of 300 $\mu$m in thickness, 2 cm in width and 4 cm in length.

(Formation of anode)

Two anode coating films were formed similary to the anode of the first embodiment, being spaced from one another at bending portion substantially the same space as the bending portion of the cathode, and were fired at 800° C. in nitrogen atmosphere for 3 hours, thereby to form an anode sheet.

(Production of battery)

The cathode and the anode were piled via a separator made of porous polyethylene film thereby to form a multi-layered electrode unit. The multilayered electrode unit was folded at the bending portions to make the stacked electrode.

By covering the stacked electrode with an insulating film, a battery element was made. The battery element was put into a square battery can which was filled with an electrolytic solution prepared by adding 1 mol/L of $LiPF_6$ to a mixed solvent of ethylene carbonate and dimethyl carbonate in a volume ratio of 1:1. The battery can was sealed thereby completing the battery.

With the method described above, since two cathodes are joined onto the cathode current collector into a single body, handling is made easier than the case of handling individual cathodes. Charge/discharge test conducted on 20 batteries thus produced showed that all the batteries provided the charge and discharge capacities corresponding to the active material.

Since the lithium secondary battery of the present invention employs the cathode including the porous sintered material made from the lithium-transition metal oxide with a porosity in a range from 15 to 60% and the electrical conductivity of more than 0.1 mS/cm, as described above, the cathode has higher mechanical strength. Also because the internal electrical resistance of the battery is decreased, the battery has larger capacity and excellent cycle characteristic.

According to the method of producing the lithium secondary battery of the present invention, since the cathode made of the material sintered at a temperature higher than the melting point of the current collector is heated to a temperature lower than the melting point of the current collector thereby to integrate with the current collector, strength and electrical conductivity of the cathode can be improved and, at the same time, contact resistance can be decreased without damaging the current collector by thermal deformation. Thus the lithium secondary battery having larger capacity and excellent cycle characteristic is provided.

The method of producing the lithium secondary battery of the present invention also makes it possible to form the cathode having larger surface area and uniform thickness and density and decrease the thickness of the lithium secondary battery, because the coating film containing the cathode material consisting of the lithium-transition metal oxide is sintered.

The method of producing the lithium secondary battery of the present invention also makes it possible to improve the adhesion between the sintered material and the current collector and decrease the electrical contact resistance, thereby improving the cycle characteristic of the lithium secondary battery, because the sintered material with uniform thickness is joined to the current collector by pressing and heating.

In the lithium secondary battery of the present invention, since the electrodes made of the sintered material are piled by accurately aligning the cathodes and the anodes, the electrodes does not shift from the predetermined positions. Since only one lead is required for each of the cathodes and the anodes, electrical collection is made easier. Thus the non-aqueous secondary battery of low cost and high reliability can be provided.

What is claimed is:

1. A process for producing a lithium secondary battery comprising a cathode and an anode, each electrode including an active material capable of incorporating and releasing lithium ions, the cathode being a sintered material, the process comprising sintering a lithium-transition metal oxide at a temperature higher than a melting point of a current collector to form a sheet consisting of sintered material, then pressing the sheet consisting of sintered material to the current collector; and heating the resulting product at a temperature lower than the melting point of the current collector, thereby integrating the sheet consisting of sintered material and the current collector.

2. The process according to claim 1, further comprising:

(a) adding a binder and a solvent to a cathode material including powder of the lithium-transition metal oxide, thereby to prepare a coating solution; and (b) applying the coating solution to a base material and removing the solvent to form a coating film, wherein the sintering comprises (c) firing the coating film in the presence of oxygen to sinter the cathode material, thereby to form the sheet consisting of sintered material.

3. The process according to claim 1, wherein the sheet consisting of sintered material has a porosity in a range from 15 to 60% and an electrical conductivity of more than 0.1 mS/cm.

4. The process according to claim 1, further comprising forming a stacked body formed of a multilayered electrode unit which includes cathodes and anodes piled via a separator and has a strip-shaped current collector, wherein at least the cathodes are sintered materials which are aligned on and joined to one of the current collectors and spaced from one another at bending portions defined by desirable intervals on the current collector, and the cathodes and the anodes are disposed in the stacked body, with each anode opposed to the respective cathode.

5. The process according to claim 1, wherein the sintering temperature of the lithium-transition metal oxide is in a range of from 700 to 1100° C.

6. The process according to claim 1, wherein the sintering temperature of the lithium-transition metal oxide is in a range of from 800 to 1000° C.

7. The process according to claim 2, wherein the sintering temperature of the lithium-transition metal oxide is in a range of from 700 to 1100° C.

8. The process according to claim 2, wherein the sintering temperature of the lithium-transition metal oxide is in a range of from 800 to 1000° C.

9. The process according to claim 2, wherein the sheet of sintered material has a porosity in a range from 15 to 60% and an electrical conductivity of more than 0.1 mS/cm.

10. The process according to claim 3, wherein, prior to the sintering, the lithium-transition metal oxide is mixed with a pore-forming agent.

11. The process according to claim 1, wherein, prior to the sintering, the lithium-transition metal oxide is mixed with a pore-forming agent.

12. The process according to claim 11, wherein the pore-forming agents is a substance that is completely oxidized and decomposes in an air atmosphere at a temperature close to the thermal decomposition temperature of the binder.

13. The process according to claim 12, wherein the binder comprises short fibers of organic materials.

14. The process according to claim 13, wherein the short fibers have a diameter from 0.1 to 100 µm.

15. The process according to claim 3, wherein the porosity is from 30 to 50%.

* * * * *